United States Patent [19]

Rajashekara et al.

[11] Patent Number: 5,751,069
[45] Date of Patent: May 12, 1998

[54] HEAT ENGINE GENERATOR CONTROL SYSTEM

[75] Inventors: Kaushik Rajashekara, Carmel, Ind.; Bhanuprasad Venkata Gorti, Towson, Md.; Steven Robert McMullen, Anderson; Robert Joseph Raibert, Fishers, both of Ind.

[73] Assignee: General Motors Corporation, Detroit, Mich.

[21] Appl. No.: 674,057

[22] Filed: Jul. 1, 1996

[51] Int. Cl.$^6$ .................................................. H02P 9/04
[52] U.S. Cl. .................. 290/40 C; 290/40 R; 290/40 B; 322/15
[58] Field of Search ............... 322/15, 38; 290/40 B, 290/40 C

[56] References Cited

U.S. PATENT DOCUMENTS

| | | | |
|---|---|---|---|
| 3,782,106 | 1/1974 | Hakansson | 60/24 |
| 4,377,074 | 3/1983 | Jardine | 62/183 |
| 4,956,598 | 9/1990 | Recker et al. | 322/28 |
| 4,994,004 | 2/1991 | Meijer et al. | 475/149 |
| 4,994,684 | 2/1991 | Lauw et al. | 290/52 |
| 5,172,784 | 12/1992 | Varela, Jr. | 180/65.4 |
| 5,255,175 | 10/1993 | Uchino | 363/81 |
| 5,545,928 | 8/1996 | Kotani | 290/40 C |
| 5,552,640 | 9/1996 | Sutton et al. | 290/40 B |

Primary Examiner—Steven L. Stephan
Assistant Examiner—Nicholas Ponomarenko
Attorney, Agent, or Firm—Vincent A. Cichosz

[57] ABSTRACT

An electrical power generation system includes a heat engine having an output member operatively coupled to the rotor of a dynamoelectric machine. System output power is controlled by varying an electrical parameter of the dynamo-electric machine. A power request signal is related to an engine speed and the electrical parameter is varied in accordance with a speed control loop. Initially, the sense of change in the electrical parameter in response to a change in the power request signal is opposite that required to effectuate a steady state output power consistent with the power request signal. Thereafter, the electrical parameter is varied to converge the output member speed to the speed known to be associated with the desired electrical output power.

10 Claims, 5 Drawing Sheets

HEAT ENGINE GENERATOR CONTROL SYSTEM

The Government of the United States of America has rights in this invention pursuant to Subcontract 0001252 under Subcontract CPB-09728 under Subcontract ZCB-3-13032 under Prime Contract No. DEAC36-83CH10093 awarded by the U.S. Department of Energy.

BACKGROUND

This invention is related to power generation systems comprising heat engines and electric generators. More particularly, the invention is concerned with the system output power control.

In a power generation system, such as a heat engine prime mover has an output member operatively coupled to the rotor of an electric power generator for conversion of the engine mechanical output power to electrical output power. Such systems may be utilized in motive applications such as series hybrid electric vehicles or for stationary applications such as back-up electrical power generation systems, load leveling power generation systems or other power grid applications.

It is known to control the power output of a heat engine by way of varying an enclosed working gas mass. Another known power output control retains a constant working gas mass and varies the displacement and pressure ratio by varying the piston stroke. Known systems for the latter control include use of a variable swashplate mechanism, the angle of which is controlled in accord with an actuator mechanism such as a hydraulic or electric motor actuator. Each type of control is relatively slow responding to demanded changes in the output power.

SUMMARY

Therefore, it is an object of the present invention to control the power output of a heat engine having relatively quick response time.

It is another object of the present invention to control the power output of a heat engine by non-mechanical means.

In furtherance of these objectives and others, a power generating system having a heat engine such as a stirling cycle heat engine imparts torque to an output member. The heat engine has a working gas and an input heat source for providing heat input thereto. The working gas mass is preferably fixed as is the piston stroke of the engine. A temperature control is effective to maintain the working gas mass at a substantially constant temperature and may take the form of a closed loop temperature control.

A dynamoelectic machine, such as an induction generator is effective to produce an electrical output power. The machine has a rotor operatively coupled to the output member of the heat engine and imposes a load torque upon the output member in accordance with certain controlled electrical parameters.

Rotational speed is sensed by sensing means such a variable reluctance or magneto-resistive sensors. Electrical output power is requested by way of a power request signal which may take the form of a signal from a system controller or directly from an operator input.

Means are provided for adjusting at least one electrical parameter in response to the power request signal. The output member is thereby controlled to a speed determined in accordance with known speed versus power output relationships of the heat engine.

In accord with one aspect of the present invention, the input heat source is a fuel combustion system.

In accord with another aspect of the present invention, the dynamoelectric machine is an induction machine providing a multi-phase output.

A preferred electrical parameter controlled to effectuate the desired speed is output current.

A method for controlling the electrical output power of such a power generating system is also presented herein and includes the monitoring a signal indicative of a desired electrical output power. When the electrical output power is not equivalent to the desired electrical power, an electrical parameter is adjusted such that the load upon heat engine output member changes to cause acceleration of the output member. The adjustment of the electrical parameter which causes such acceleration results in a change in the electrical power output in a direction opposite to the desired output power. However, the acceleration of the output member occurs in the direction such that the output member speed approaches a speed known to be associated with the desired electrical output power. Thereafter, control of the electrical parameter is in the direction to effectuate convergence of the output member speed to the speed known to be associated with the desired electrical output power.

BRIEF DESCRIPTION OF THE DRAWINGS

The present invention will now be described, by way of example, with reference to the accompanying drawings, in which.

DETAILED DESCRIPTION

Figure 1:
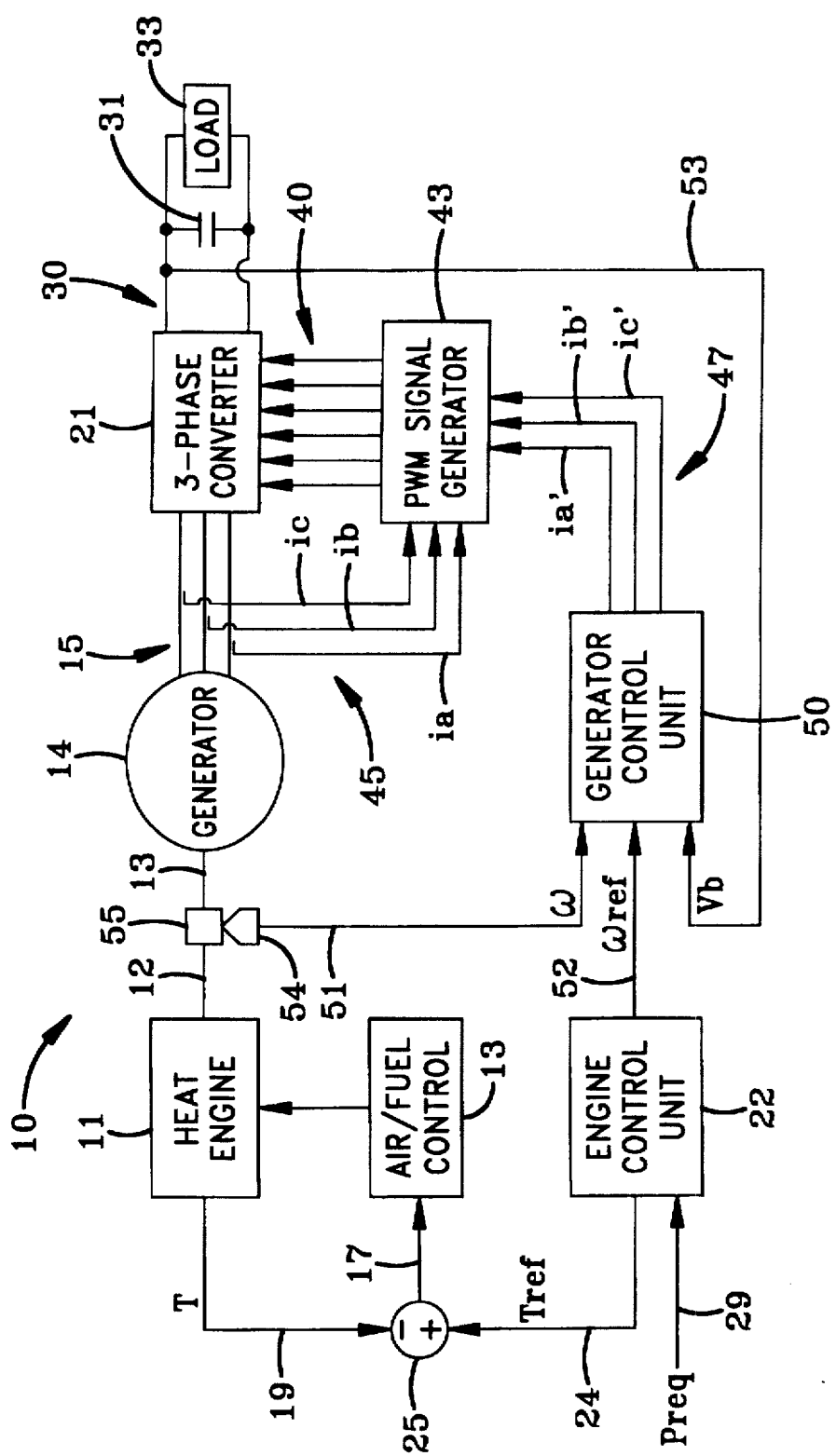
FIG. 1 is block diagram of a power generation system embodying the present invention.

With reference to the appended drawings and particularly with reference to FIG. 1, a block diagram of a power generation system is generally labeled with the numeral 10. A heat engine 11 is the electrical generation system prime mover. In a test embodiment, a 40 KW stirling cycle heat engine from Stirling Thermal Motors, Inc. was employed. A stirling cycle engine is the preferred heat engine in the present application for reasons including a relatively constant torque at the output member over a wide speed range. The preferred heat source is from a substantially continuous fuel combustion process in a heat chamber from which the heat is transferred to the heat engine's working fluid. Such fuel combustion systems are generally well known to those versed in the art of heat engines. Alternative heat sources, for example solar sources, may also be employed. Reciprocating or cyclic pistonic motion of such an engine is mechanically transmuted to rotative motion and coupled to an output member 12. The output member 12 is operatively coupled to an input member 13 of an electric generator 14, an induction machine in the present exemplary embodiment, to thereby couple the output torque of the engine to the rotor (not separately illustrated) of the generator 14 for conversion of the mechanical energy of the engine 11 to electrical energy. Electric generator 14 may comprise any of a variety of dynamoelectric machine topologies including single or multi-phase AC machines, DC machines, salient pole machines, and permanent magnet machines, among others. The output member of the engine 12 may be directly coupled to the input member 13 of the electric generator thereby driving the rotor at a 1:1 speed ratio, or may alternatively be coupled to the input member through a gear set (not shown) such as a planetary gear set or chain and sprocket set to establish a speed ratio other than unity. The generator 14 further comprises an alternating current multi-phase output, three-phase in the present exemplary embodiment as generally depicted by the three-phase power output line set generally labeled 15 in the figure.

Three-phase power converter 21 comprises a conventional three-phase bridge converter including controlled switching power devices such as high current insulated gate bipolar transistors (IGBT) arranged in phase pairs effective to rectify the AC three-phase output from the generator to a predetermined DC output onto DC power bus generally labeled 30. Also coupled to power bus 30 is an electrical storage means such as one or more capacitors or electrochemical storage batteries 31 and system loads generally designated 33 in the figure. Exemplary system loads include motive drive systems including drive motor, power inverter and ancillary vehicle loads in the case of a motor vehicle application. System loads shall generally mean any DC bus coupled component or system which consumes or redistributes any combination of stored or generated electrical energy from the generation system. Power converter may also be operated as a DC to AC inverter for providing a variable voltage, variable frequency AC supply to the generator for operation in a motoring mode. Alternatively, if the generator comprises a salient pole machine with a rotor field coil, a passive bridge inverter may be employed in place of the controlled converter as illustrated. In any case, an electrical output power is produced by the generator in accordance with the Bus voltage and output current. As used herein, output current refers to the DC current delivered to the DC power bus. In applications not employing rectification of a generated AC output, output current refers to the AC analog of such a DC output current.

Pulse width modulation (PWM) generator includes well known gate drive circuitry including appropriate gate drive isolation amplifiers for controlling the conduction states of the power devices of the converter. Upstream of the gate drive circuitry is a conventional three-phase PWM signal generator 43 employed in establishing the PWM drive signals on lines 40 for controlling the switching instants or conduction timing of the power devices of the converter 21 in accordance with respective phase currents (ia, ib, ic) on sense lines 45 and commanded phase currents (ia', ib', ic') on lines 47. Phase currents are sensed by conventional current sensor, for example shunt current sensors or hall effect current sensors. Respective phase error signals are preferably generated with respect to phase currents on lines 45 and commanded phase currents on lines 47 and are subjected to conventional proportional-integral (PI) processing for appropriate response and stability. The phase error signals are then compared with a respective phase of a high frequency triangular reference wave to arrive at a corresponding number of digital PWM reference signals which are further processed by conventional gate drive circuitry to provide inverted and non-inverted, isolated, PWM drive signals on lines 40. Alternative PWM generation techniques may successfully be employed, including space vector pulse width modulation.

Stirling cycle heat engine 11 fuel flow is controlled in accord with a closed loop temperature control. As such, fuel is introduced into a burn chamber or heater at a controlled rate where a substantially continuous burn occurs. Air and fuel flow to the heater is by way of air/fuel control hardware 13 such as conventional fuel delivery system valves, fuel pressure regulators and combustion blowers controlled in response to temperature control signal on line 17. Heater temperature T is monitored by line 19. A reference heater temperature or desired heater temperature is provided by engine control unit 22 on line 24 and is summed at node 25 with the monitored heater temperature to complete the closed loop heater temperature control.

Engine control unit 22 is a computer based control unit for executing program instructions for carrying out the closed loop heater control among various other functions such as diagnostic functions. The engine control unit is illustrated with respect to a pair of outputs, heater reference temperature Tref on line 24 and speed reference ωref on line 52. Speed reference is determined by the engine control unit in accordance with the requested or demanded power output as embodied in a power request signal Preq. Thus, the engine control unit is illustrated having an input thereto corresponding to the requested power output Preq on line 29. Preq may be a digital or analog signal generated by a computer based system controller (not shown) which determines an appropriate power operating point in accord with a set of predetermined system objectives or may be a setpoint signal obtained from a manually operated input device. Regardless of the source or form of the requested power signal Preq, it is understood that Preq generally represents a desired level of power output.

In accordance with the present invention, generator control unit is a computer based controller including a CPU, ROM, RAM, A/D and D/A, and a high speed internal clock. Generator control unit 50 has three inputs thereto including a rotation speed signal ω on line 51 which is proportional to the speed of generator 14 and engine output 12, a desired speed or reference speed ωref for the rotation speed signal on line 52, and the bus voltage Vb which is substantially equivalent to the battery 31 voltage on line 53. The reference speed ωref is supplied to the generator control unit 50 by the engine control unit as a function of the power requested. The rotation speed signal is supplied on line 51 and is developed by the cooperation of a sensor 54 and rotating member 55. Rotating member 55 rotates in proportion to the rotor of generator 14 and engine output member 12 of engine 11. Rotating member 55 may comprise a toothed gear or encoder wheel and the sensor may comprise a variable reluctance or magnetoresistive sensor in fixed proximity to the rotating member periphery. The bus voltage signal is supplied by way of sense line 53 coupled to the positive rail of the bus.

Figure 2:
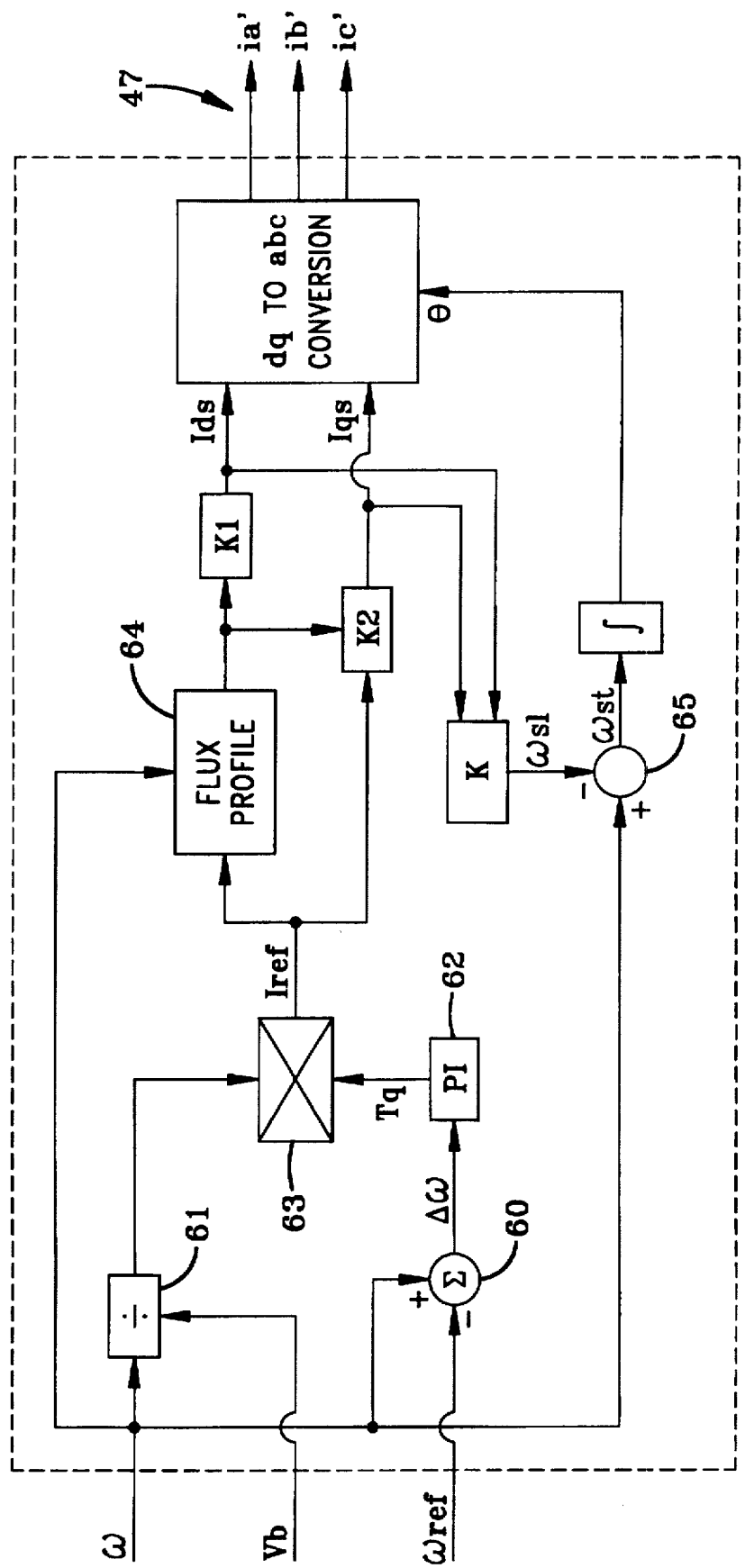
FIG. 2 is a block control diagram of a preferred method of controlling the power output of the power generation system of FIG. 1.

The generator control unit includes in ROM a series of program instructions for performing the power output control as illustrated in the functional block diagram of the control algorithm performed by the generator control unit of FIG. 2. At the left side of the figure are the input quantities discussed in conduction with the hardware block diagram of FIG. 1. The measured speed ω is compared with the reference speed ωref at summing node 60 to generate a speed error signal Δω which is processed by a proportional-integral (PI) control 62 resulting in a signal Tq which is proportional to the torque of the engine. The PI steps make use of a proportional gain constant (K3) and an integral gain constant (K4) selected in accordance with system time constant and generator electrical parameters. In the present embodiment, K3 and K4 are substantially 2.5 and 0.4, respectively. The PI equation takes the form as follows:

$$Tq=(K3+K4/s)*\Delta\omega \quad (1)$$

By multiplying Tq by the generator speed ω and dividing the product by the bus voltage Vb, a signal Iref results which is proportional to the sourced DC current. This relationship may be expressed as follows:

$$Iref=Tq*\omega/Vb \quad (2)$$

Next, the reference current signal Iref is used to develop direct and quadrature axis current vector components, Ids and Iqs respectively, in the synchronous d-q reference frame for the three phase generator. First, a predetermined flux profile 64 representing, preferably, high generator efficiencies across the speed operating range of the system provides a generator flux value (flux) in accord with the measured speed ω and reference current signal Iref. The direct axis current component, Ids, is calculated as a function of flux and the generator mutual inductance (Lm) as follows:

$$Ids=K1*flux \quad (3)$$

where K1=1/Lm. The quadrature axis current component, Iqs, is calculated as a function of the reference current Iref, flux, generator mutual inductance, rotor inductance (Lr), and number of rotor pole pairs (Pp), as follows:

$$Iqs=(Iref*K2)/flux \quad (4)$$

where K2=2*Lr/(3*Lm*Pp).

The two current quantities are further processed to obtain therefrom the generator slip frequency ωsl in accord with the following function:

$$\omega sl=K*Iqs/Ids \quad (5)$$

where K is the inverse of the rotor electrical time constant (Tr) where Tr is equivalent to the rotor inductance divided by the rotor resistance (Lr/Rr). Generator slip frequency ωsl is then subtracted from measured speed ω at node 65 to obtain the stator rotating field speed ωst. Stator rotating field speed ωst is integrated to obtain phase angle θ varying from 0 and 360 degrees.

Finally, with respect to the control block diagram of FIG. 2, the frequency, magnitude and angle information of the direct and quadrature axes current components Ids and Iqs, respectively, and the phases angle θ are used to develop the three-phase current commands 47 (ia', ib', ic').

Figure 3:
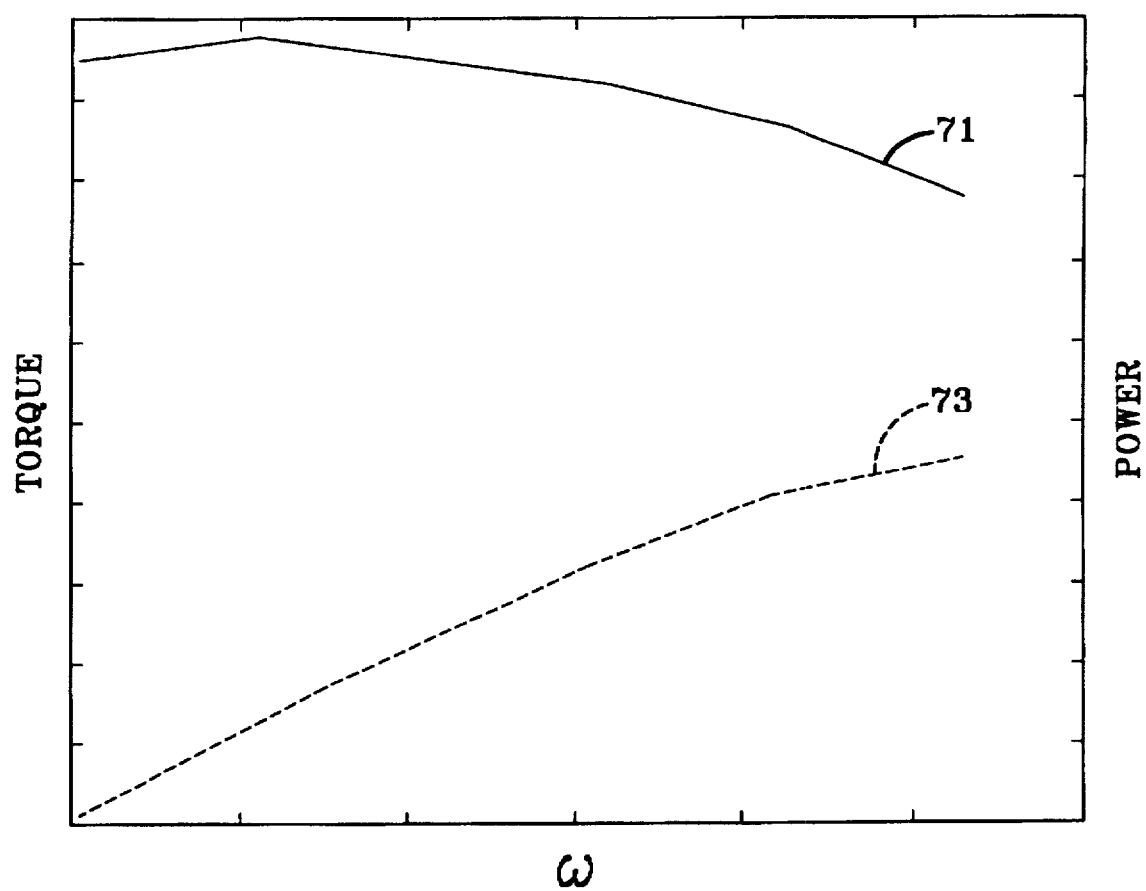
FIG. 3 is a graph generally depicting torque and power characteristics of a stirling cycle heat engine.

In operation, the generator control as described is effective to control the power output of the power generating system by way of the generator electrical parameters. The power output of the stirling cycle heat engine is slave responsive to the control of the generator. The stirling cycle heat engine is particularly well suited for application of the generator output control due to the characteristically flat torque output exemplified in trace 71 of the graph of FIG. 3 versus engine speed as exhibited in trace 73 of the graph of FIG. 3. As the product of rotational speed and torque, power therefore is substantially linear throughout a majority of the engine speed range. Therefore, direct correspondence between engine output speed and output power provides for convenient indirect control of engine power by way of unique speed control of the generator.

Figure 5A:
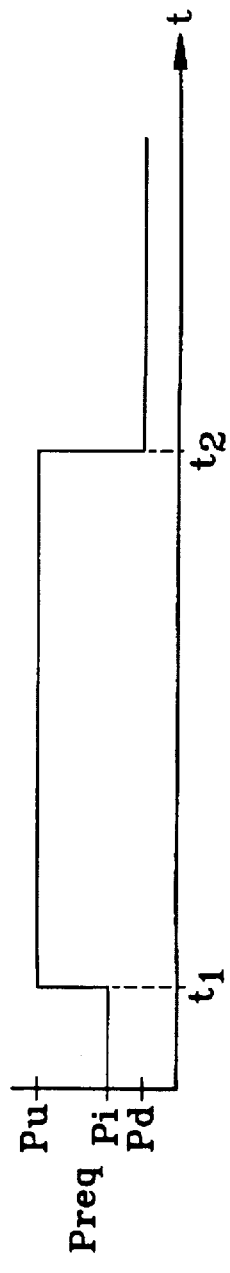
FIGS. 5A–5D are graphical representations of various quantities of the power generation system controlled in accord with the present invention.
Figure 5B:
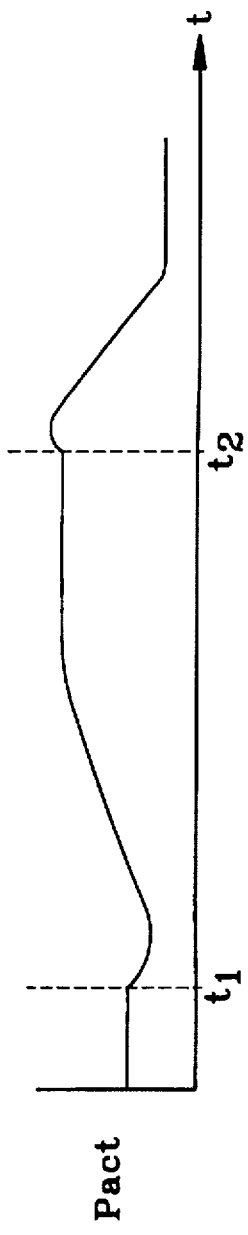
Figure 5C:
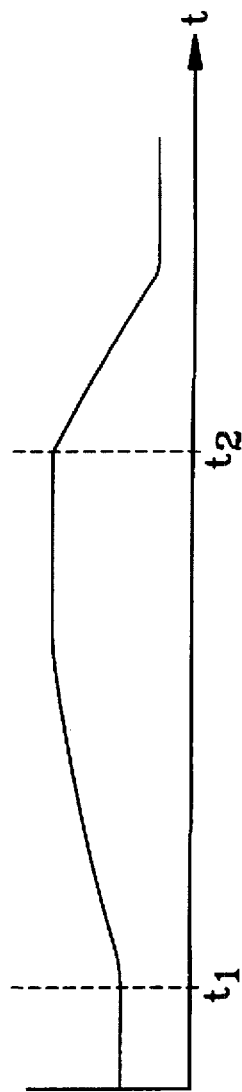
Figure 5D:
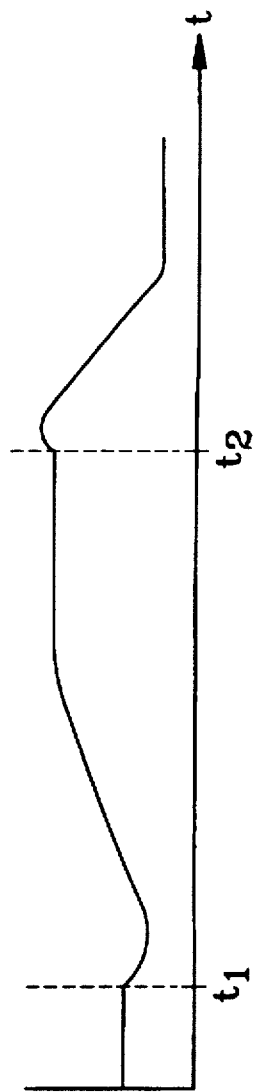

Operation of the system may be best exemplified with reference to FIGS. 5A–5D. All graphical representations of these figures share a common horizontal time axis and illustrate various parameters of the system for a period wherein power demand changes from an arbitrary initial state (Pi) up to a higher power state (Pu) and thence down to a lower power level state (Pd). FIG. 5A illustrates the power request signal Preq. FIG. 5B illustrates the actual system power output Pact. FIG. 5C illustrates the engine output member speed and, in the present embodiment having a direct drive of the rotor by the engine output member, the rotor speed ω. Finally, figure 5D illustrates the reference current Iref developed by the control of the present invention.

Initially, the system is assumed operating steady state where the power output Pact corresponds to the power requested Preq and the speed and reference current are stable. At a time t1, a greater power is demanded as exemplified by the step in the Preq trace of FIG. 5A. The reference speed ωref, as mentioned, is supplied to the generator control unit 50 by the engine control unit as a function of the power requested. Preferably, the reference speed ωref is derived from a look-up table comprising power requested Preq as the independent variable and reference speed ωref as the dependent variable. The positive linear correspondence of the reference speed to the power demanded will result in a negative speed error signal Δω which initially drives down the torque reference signal Tq in accord with the selected PI control parameters and results in a proportional reduction in the reference current Iref. Ultimately, the power output of the system, Pact, follows the reference current signal as can be seen by examination of FIGS. 5B and 5D. The unloading of the engine output member allows the output member speed to increase as illustrated in FIG. 5C. As the engine speed increases, the closed loop temperature control adjusts the fueling to maintain the set temperature. As the measured speed ω increases and converges on the reference speed ωref, the speed error becomes smaller and the torque reference recovers in accord with the selected PI control parameters. Additionally, as the measured speed ω increases, so too does the multiplicative factor ω/Vb contributing to reference current product Iref. Finally, the convergence of the measured speed with the reference speed stabilizes resulting in a reference current Iref which is consistent with the newly demanded and attained power level Pu and Pact, respectively. The closed loop heat control has, apart from the present inventive control, also attained equilibrium, the fuel delivery system now stabilized at the temperature setpoint independently established.

Similarly, beginning at time t2, reduced power is demanded as exemplified by the step in the Preq trace of FIG. 5A. The resulting positive speed error signal Δω will initially drive up the torque reference signal Tq in accord with the selected PI control parameters and results in a proportional increase in the reference current Iref. Ultimately, the power output of the system, Pact, follows the reference current signal as can be seen by examination of FIGS. 5B and 5D. The increased loading of the engine output member slows the output member speed as illustrated in FIG. 5C. As the engine speed decreases, the closed loop temperature control adjusts the fueling. As the measured speed ω decreases and converges on the reference speed ωref, the speed error becomes smaller and the torque reference recovers in accord with the selected PI control parameters. Additionally, as the measured speed ω decreases, so too does the multiplicative factor ω/Vb contributing to reference current product Iref. Finally, the convergence of the measured speed with the reference speed stabilizes resulting in a reference current Iref which is consistent with the newly demanded and attained power level Pd and Pact, respectively. The closed loop heat control has, apart from the present inventive control, also attained equilibrium, the fuel delivery system now operating at the temperature setpoint independently established.

Figure 4:
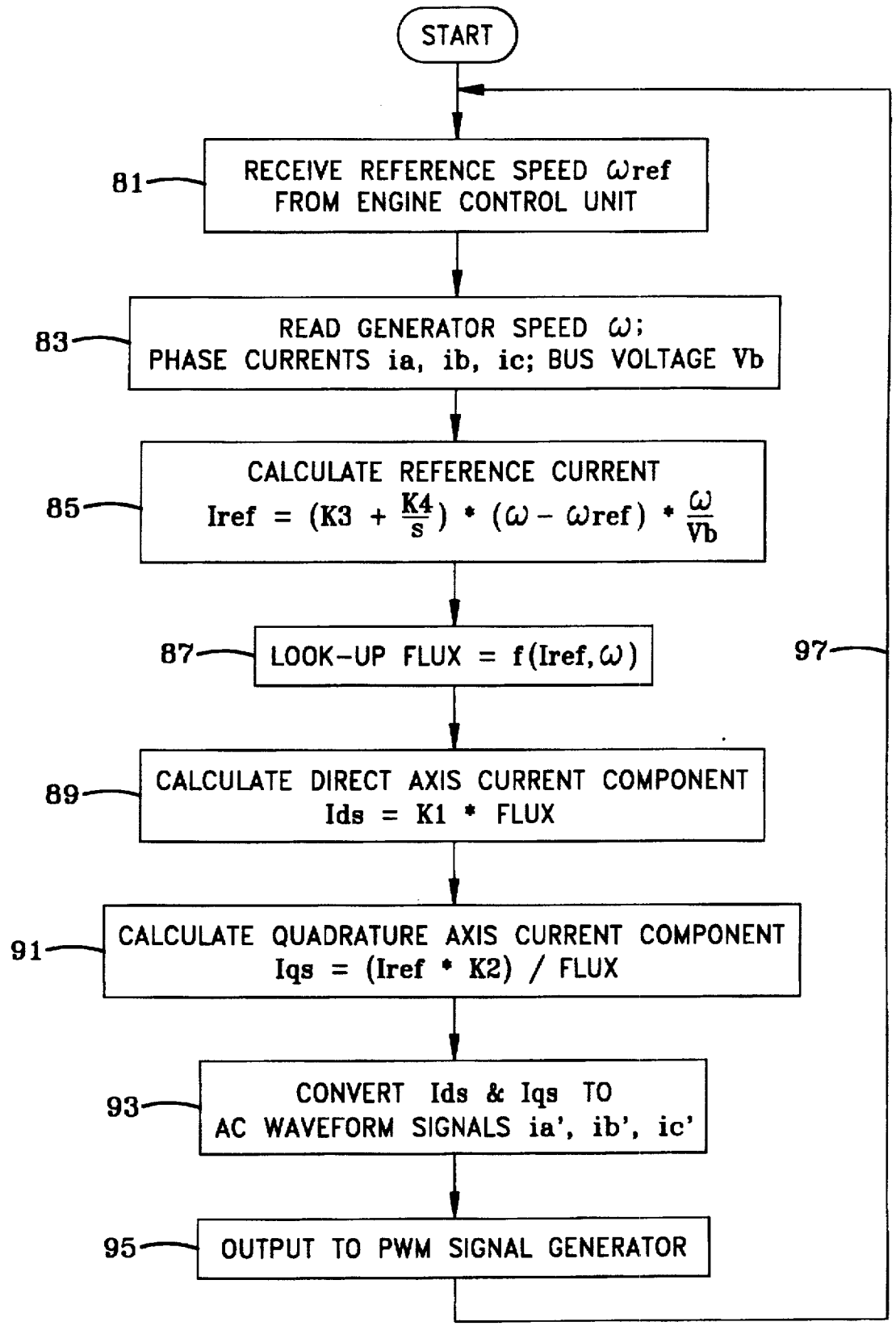
FIG. 4 is a flow chart representing program instructions for execution by the generator control unit of FIG. 1 in carrying out the control of the present invention.

With reference now to the flow chart of FIG. 4, an exemplary set of steps for implementation as a set of program instructions by the generator control unit 50 of FIG. 1 for implementing the control as described is illustrated. It is understood that the flow chart of FIG. 4 may be part of a much larger set of program instructions for carrying out other tasks, such as diagnostics, relative to the operation of the generator. Beginning with block 81, the reference speed signal ωref is received by the generator control unit from the engine control unit. Block 83 executes instructions to read, filter and otherwise condition the generator speed ω, phase currents ia, ib, and ic, and bus voltage Vb into working memory. Calculation of the reference current is next performed at block 85 in accordance with the PI control wherein K3 and K4 are the selected proportional and integral gain constants chosen in accordance with the generator electromechanical time constants to obtain the desired response characteristics of the system and control loop stability. Block 87 represents referencing of a table containing mapped flux data as a function of reference current Iref and generator speed ω. Such table data may comprise values derived experimentally in accordance with certain preferred operating objectives including, for example, machine efficiencies, machine temperature constraints and generator torque levels. Blocks 89 and 91 next calculate values for direct and quadrature axes current components, respectively. Calibration constants K1 and K2 are derived from the generator mutual inductance, rotor inductance, and number of machine pole pairs in the present embodiment implemented with an induction machine. At step 93, the direct and quadrature axes current components Ids and Iqs are then converted to appropriate three-phase AC waveform signals ia', ib', and ic' having frequency, phase and magnitude information for use in the development of PWM control signals. Such transformation may be accomplished by standard coordinate transformations performed, for example, in accordance with a standard vector transformation matrices such as:

$$\begin{bmatrix} ia' \\ ib' \\ ic' \end{bmatrix} = \begin{bmatrix} \cos\Theta & -\sin\Theta \\ \cos(\Theta - 2\Pi/3) & -\sin(\Theta - 2\Pi/3) \\ \cos(\Theta - 2\Pi/3) & -\sin(\Theta - 2\Pi/3) \end{bmatrix} \begin{bmatrix} ids \\ iqs \end{bmatrix} \quad (5)$$

Finally, block 95 provides the three-phase AC waveform signals ia', ib' and ic' to the PWM signal generator for controlling the conduction states of the power switching devices of the three-phase bridge converter. The program instructions are continuously executed as indicated by return line 97 to provide for the continuous control of the generator.

While the invention has been described with respect to certain preferred embodiments, it is anticipated that various modifications will be apparent to one versed in the art without departing from the scope of the invention as defined in the following claims.

We claim:

1. An electrical power generation system comprising:
   a heat engine for imparting torque to an output member, including a working gas, an input heat source, and a temperature control for maintaining the working gas at a substantially constant predetermined temperature;
   a dynamoelectric machine for producing an electrical output power having a rotor operatively coupled to the output member, said machine imposing a load torque upon the output member in accordance with at least one controllable electrical parameter;
   speed sensing means for detecting the speed of the output member;
   a power request signal indicative of a desired level of electrical output power; and,
   means for adjusting said at least one electrical parameter in response to the power request signal to control the output member to a predetermined speed consistent with said desired level of electrical output power.

2. An electrical power generation system as claimed in claim 1 wherein said input heat source comprises a fuel combustion system and said temperature control comprises a closed loop control for adjusting the fuel delivery system in response to deviation of working gas temperature from a predetermined desired temperature.

3. An electrical power generation system as claimed in claim 1 wherein said dynamoelectric machine comprises an induction machine including a stator and polyphase output windings.

4. An electrical power generation system as claimed in claim 1 wherein said heat engine comprises a fixed piston stroke.

5. An electrical power generation system as claimed in claim 1 wherein said working gas comprises an unaltered mass.

6. An electrical power generation system as claimed in claim 3 wherein said means for adjusting said at least one electrical parameter comprises output current control means.

7. An electrical power generation system comprising:
   a heat engine for imparting torque to an output member, including a working gas and an input heat source;
   a dynamoelectric machine for producing an electrical output power having a rotor operatively coupled to the output member, said machine imposing a load torque upon the output member in accordance with at least one controllable electrical parameter;
   a closed loop temperature control effective to maintain the working gas at a substantially constant temperature; and
   a closed loop speed control effective to adjust said at least one controllable electrical parameter to control the speed of the rotor to a predetermined desired speed by controlling the load torque imposed upon the output member.

8. An electrical power generation system as claimed in claim 7, wherein said dynamoelectric machine comprises a three-phase induction machine including a stator and said at least one controllable electrical parameter includes the speed of a rotating field established in the stator.

9. A method for controlling the electrical output power of a power generating system having a heat engine for imparting torque to an output member, including a working gas, an input heat source, and a closed loop temperature control for maintaining the working gas at a substantially constant predetermined temperature, and a dynamoelectric machine for producing electrical output power having a rotor operatively coupled to the output member, said machine imposing a load torque upon the output member in accordance with at least one controllable electrical parameter, the method comprising:

monitoring a signal indicative of a desired electrical output power;

when the electrical output power is not equivalent to the desired electrical power, momentarily controlling said at least one controllable electrical parameter to effectuate a change in the load torque imposed upon the output member whose sense is opposite that required to attain the desired electrical power resulting in an acceleration of said output member toward a speed known to be associated with the desired electrical output power, and thereafter controlling said at least one controllable electrical parameter to effectuate convergence of said output member speed to said speed known to be associated with the desired electrical output power.

10. The method for controlling the electrical output power of a power generating system as claimed in claim 9 wherein said at least one controllable electrical parameter comprises output current.

* * * * *